Jan. 17, 1967　　　　　J. H. LUX　　　　　3,299,192
METHOD OF EXTRUDING A FOAMED PLASTIC TUBE HAVING
INTERNAL AND EXTERNAL SKINS THEREON
Filed June 11, 1963
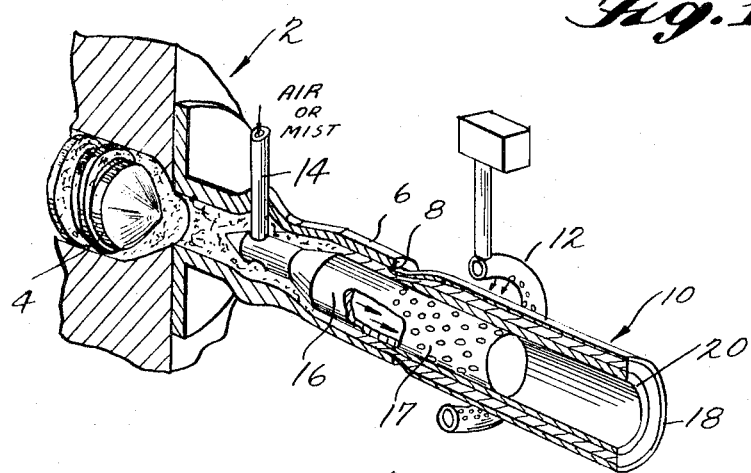
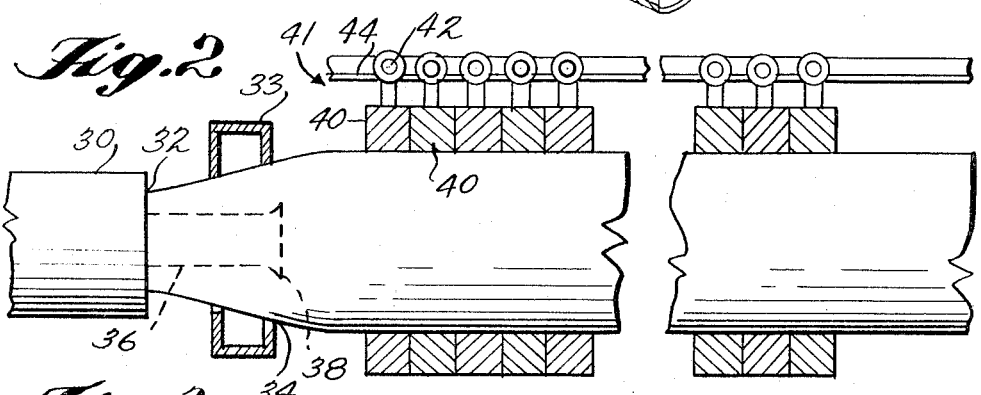
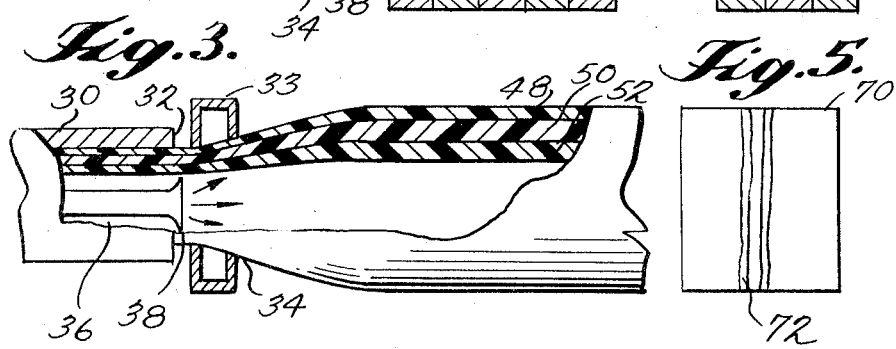
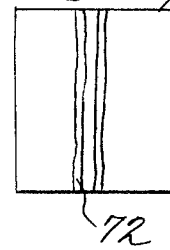
INVENTOR
John H. Lux
BY Cushman, Darby + Cushman
ATTORNEYS 3,299,192
METHOD OF EXTRUDING A FOAMED PLASTIC TUBE HAVING INTERNAL AND EXTERNAL SKINS THEREON
John H. Lux, Charlestown, Md., assignor to Haveg Industries, Inc., a wholly-owned subsidiary of Hercules Powder Company, New Castle, Del., a corporation of Delaware
Filed June 11, 1963, Ser. No. 287,128
5 Claims. (Cl. 264—48)

This invention relates to the preparation of foamed plastic pipe. Ordinary extruded plastic pipe, e.g., Allan Patent 2,814,071, resists corrosion and is light in weight. Such pipe, however, in many cases, suffers from the disadvantages of excessive sagging. If extruded, foamed plastic pipe is normally not suitable for carrying fluids without leakage.

It is an object of the present invention to develop an improved method of molding a plastic pipe.

A further object is to mold a foamed plastic pipe which can be used to transport fluids.

An additional object is to eliminate sagging of plastic pipe while at the same time increasing the rigidity of the pipe per unit of weight due to the particular method of molding the pipe.

Yet another object is to develop a more suitable method of molding a plastic pipe for carrying water.

A still further object is to mold a plastic pipe with superior thermal insulation properties.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by forming a foamed tube or pipe consisting of (1) a thermoplastic resin core, (2) a non-porous, tough, thermoplastic resin outer skin and (3) a non-porous, tough, thermoplastic resin inner skin, said core comprising 50 to 94% of the total thickness of the skins and core, said core being integrally united to said skins. The skins can be of equal thickness but for many uses it is advantageous for one of the skins to be thicker than the other, e.g., the inner skin can be 2 to 5 times as thick as the outer skin when fluid, e.g., water or stream under some pressure, are to be carried through the pipe.

It is desirable for most uses that the foamed plastic pipe have a density between 5 and 45 lbs./cu.ft., preferably between 18 and 40 lbs./cu. ft.

Various polymers can be used to form the foamed plastic.

When employing polystyrene there can be employed normal crystal grade polystyrene or high impact polystyrene or a mixture containing 5 to 95% normal crystal grade polystyrene and the balance high impact polystyrene. When employing a thermoplastic styrene polymer it normally contains greater than 50% by weight of styrene and preferably at least 70% by weight of styrene in its structure. High impact polystrenes are frequently prepared by polymerizing monomeric styrene in the presence of 2½ to 10% by weight of a rubbery diene polymer or by polymerizing styrene in the presence of such amounts of a difunctional material. Examples of high impact styrene include a terpolymer of 5% acrylonitrile, 5% butadiene and 90% styrene; a copolymer of 5% butadiene and 95% styrene; the product made by polymerizing 95% of styrene in the presence of 5% of polybutadiene; a copolymer of 5% chlorosulfonated polyethylene and 95% styrene; a blend of 97.5% polystrene and 2.5% polybutadiene; a blend of 95% polystyrene and 5% hydrogenated polybutadiene containing 35.4% residual unsaturation; polystyrene formed in the presence of 5% hydrogenated polybutadiene containing 4.5% of residual unsaturation, a blend of 5% polystyrene and 5% polyisoprene, and a copolymer of 99.5% styrene and 0.5% divinyl benzene.

Unless otherwise indicated, all parts and percentages are by weight.

The foamable thermoplastic resins which can be extruded according to the invention include cellulose ethers and esters, e.g., ethyl cellulose, cellulose acetate, cellulose acetate-butyrate, homopolymers and interpolymers of monomeric compounds containing the $CH_2=C<$ grouping such as olefins, e.g., ethylene, propylene, isobutylene, vinyl halides, e.g., vinyl chloride; vinylidene chloride; vinyl esters of carboxylic acids, e.g., vinyl acetate, vinyl stearate, vinyl benzoate; vinyl ethers, e.g., vinyl methyl ether, vinyl ethyl ether; vinyl isobutyl ether; vinyl isobutyl ether; chlorotrifluoroethylene; unsaturated carboxylic acids and derivatives thereof, e.g., acrylic acid, methacrylic acid, methyl acrylate, ethyl acrylate, methyl methacrylate, acrylamide; acrylonitrile, methacrylonitrile; and interpolymers of the above-mentioned vinylidene monomers with alpha, beta-unsaturated polycarboxylic acids and derivatives thereof, e.g., maleic anhydride, diethyl maleate, dibutyl fumarate, diallyl maleate, dipropyl maleate, etc. A preferred class of materials with which optimum results are obtained are rigid, relatively non-elastic thermoplastic resins such as homopolymers and interpolymers of vinyl chloride, homopolymers of vinylidene aromatic hydrocarbons and ring halogenated derivatives thereof, e.g., styrene, o-chlorostyrene, p-chlorostyrene, 2,5-dichlorostyrene, 2,4-dichlorostyrene, p-methylstyrene, p-ethylstyrene, alpha-methylstyrene, vinyl naphthalene, and interpolymers of such vinylidene monomers with each other and with other vinylidene monomers in which the interpolymer contains at least 70% of the vinylidene aromatic hydrocarbon compound, e.g., a copolymer of 70% sytrene and 30% acrylonitrile. As previously indicated, for many uses the most preferred resins are thermoplastic styrene polymers containing at least 70% by weight styrene in the structure.

Other suitable thermoplastic resins include polycarbonates, e.g., the polymer from Bisphenol A and diphenyl carbonate; polyurethanes, e.g., from toluene diisocyanate and polypropylene glycol molecular weight 2025; Dacron (polyethylene terephthalate), nylon (e.g., polymeric hexamethylene adipamide). ABS terpolymers can be used, e.g., the terpolymer of 25% butadiene, 15% acrylonitrile and 60% styrene (a rigid ABS terpolymer), as well as other terpolymers containing 25 to 60% butadiene, 10 to 20% acrylonitrile and 20 to 60% styrene.

The invention is also of particular value with foams from polyethylene and polypropylene, as well as ethylene-propylene copolymers (e.g., a 50–50 copolymer by weight). The polyethylene can be of high density, e.g., 0.960, medium density, e.g., 0.935 or low density, e.g., 0.914.

To insure the formation of a uniform foamed plastic core, a nucleating agent should be used in forming the foamed sheet.

When a nucleating agent is employed, it is used in an amount of from 0.02 to 10% of the total polystyrene by weight. Preferably, 0.4 to 2% of the nucleating agent is used.

Conventionally, the nucleating agents are made up of two materials which react to form carbon dioxide and water. The two materials are normally used in approximately equivalent amounts. As the carbon dioxide liberating materials there can be used ammonium, alkali and alkaline earth carbonates or bicarbonates, e.g., ammonium bicarbonate, sodium bicarbonate, sodium carbonate, potassium bicarbonate, calcium carbonate. The other material is an acid or acid-reacting salt, preferably solid, which is sufficiently strong to liberate the carbon dioxide from the carbonate or bicarbonate. Generally, the acid has at least 3.0 milliequivalents of acidic hydrogen, and preferably at least 10.0 milliequivalents, per gram. The acid can be organic or inorganic. Suitable acidic materials include boric acid, sodium dihydrogen phosphate, fumaric acid, malonic acid, oxalic acid, citric acid, tartaric acid, potassium acid tartrate, chloroacetic acid, maleic acid, succinic acid and phthalic acid. In place of the anhydrous acids or salts there can be used the solid hydrates, e.g., oxalic acid dihydrate and citric acid monohydrate.

While not essential, there can also be added a wetting agent such as Bayol 35 (a petroleum aliphatic hydrocarbon white oil), kerosene having an average of at least 8 carbon atoms in the molecule, alkylphenolalkylene oxide adducts, e.g., Triton X–100 (t-octylphenol-ethylene oxide adduct having 10 ethylene oxide units in the molecule), sodium lauryl sulfate and sodium dodecylbenzene sulfonate. The wetting agent can be nonionic or anionic.

The preferred mode of incorporating the foaming agent into the polymer is by premixing the pelletized solid thermoplastic polymer, e.g., a styrene polymer, with a minor amount of an absorbent having absorbed thereon a volatile liquid (i.e., the foaming agent) which is non-reactive with and which has not more than a slight solvent action on the polymer. The liquid should volatilize below the softening point of the polymer.

As the absorbent there can be employed any conventional absorbent in finely divided form, such as diatomaceous earth (Celite), fuller's earth, silica gel, e.g., Cab-O-Sil and Hi-Sil, activated alumina, molecular sieves, attapulgus clay and activated carbon. The absorbent is usually used in an amount of 0.1–15%, preferably 0.5 to 10% by weight of the polymer, although up to 25 or 30% of absorbent can be employed. The absorbent is an inert filler of large surface area but small particle size, e.g., 200 mesh or below.

As the volatile liquid there can be used aliphatic hydrocarbons boiling between 10° and 100° C. and preferably between 30° and 90° C., e.g., petroleum ether (containing primarily pentane or hexane or a mixture of these hydrocarbons), pentane, hexane, isopentane, heptane, cyclohexane, cyclopentane, pentadiene and neopentane. Other volatile liquids include methanol, ethanol, methyl acetate, ethyl acetate, butane, acetone, methyl formate, ethyl formate, dichloroethylene, perchloroethylene, dichlorotetrafluoroethane, isopropyl chloride, propionaldehyde, diisopropyl ether, dichlorodifluoromethane, a mixture of pentane with 5 to 30% of methylene chloride or other volatile lower halogenated hydrocarbon.

The amount of volatile liquid absorbed on the absorbent can vary from 5 to 150% or more based on the weight of the absorbent. The amount of liquid absorbed will depend upon the capacity of the absorbent for the particular liquid. Normally, the absorbent containing the volatile liquid will appear to be a dry powder. The volatile liquid employed should be one which is non-reactive with the particular polymer employed. Usually, the amount of volatile liquid will be 0.1 to 15% by weight of the polymer, e.g., polystyrene, to be expanded. The amount of volatile liquid will depend upon the extent of foaming desired. In general, the greater the amount of absorbed volatile liquid in the polymer-absorbent mixture the more the expansion. It has been found that good expansion can be obtained using very small amounts of the volatile liquid.

The free flowing powder consisting of the low boiling solvent or semi-solvent adsorbed on the inert filler of large surface area is added to the extrusion grade plastic pellets, preferably along with the nucleating agent, and tumbled in a mixer. The powder containing the volatile blowing agent will then disperse uniformly throughout the mixture while adhering to the plastic pellets. The mixture is then fed into the hopper of an extruder.

The foamed thermoplastic is extruded, for example, through an annular die to produce directly the foamed plastic pipe. Cooling is supplied by jets of fluid directly on the inner and outer surfaces of the pipe as they emerge from the die. The fluid can be, for example, a gas, such as air, argon, helium, nitrogen, or carbon dioxide, a liquid, e.g., water, or a mixture of a gas and a liquid, e.g., a fine water spray or mist in air. The cooling is accomplished essentially by quenching or quick chilling the surfaces of the extruded pipe.

By regulating the temperature, time of treatment and velocity of the fluid coolant the thickness and porosity of the skin can be controlled. In general, the colder the temperature of the coolant the tighter the skin and the higher its density while the longer the time of treatment with the chillant, the thicker is the skin. Convenient temperatures for the fluid chillant are 0° to 80° F. and convenient velocities are 50 to 100 ft./sec. The thicker skins impart improved structural strength.

Pipe diameters (external) ranging from ½ inch to 8 inches or even higher, e.g., 1 foot, can be achieved according to the invention. The thickness of the foamed pipe (the two skins plus the foamed core) can be from 10 to 300 mils and usually is between 25 and 200 mils. The skins normally are at least 5 mils thick.

It has been found that the foamed thermoplastic pipes of the present invention have greater structural rigidity per unit weight than conventional plastic pipes. Also, the pipes of the present invention have greatly improved thermal insulation qualities in carrying fluids, e.g., hot or cold water, steam, air (e.g., in heating ducts), organic liquids which are inert to the particular plastic used in making the foamed pipe.

In carrying water in home plumbing installation far fewer supports are required than with regular thermoplastic pipes. Because of the thermal insulation of the foam wall the problem of sweating in hot weather is eliminated and likewise in cold weather the danger of freezing is diminished.

Of course, when hot fluids such as steam are to be transported through the pipe there should be chosen a plastic which will withstand such higher temperatures, e.g., polypropylene, polychlorotrifluoroethylene or polyethylene irradiated or peroxide cross-linked sufficiently to raise its softening point, e.g., polyethylene (Alathon 14 density 0.914) irradiated to an extent of 12 megarad.

While it is often advantageous to prepare the foamed pipe circular in cross section, this is not essential. Thus, large diameter pipes, e.g., 6 to 12 inches, which are rectangular in cross section, can be use for heating or air conditioning. When such rectangular ducts of foamed plastic are being extruded, it is possible to provide corrugations along the whole surface of the extrudate, or along one wall, or at periodic intervals along the wall. This provides a flexible duct for convenient installation in air conditioning systems.

In the drawings:
FIGURE 1 is a perspective view, partially broken away, of an apparatus for extruding a pipe according to the invention;
FIGURE 2 is a vertical elevation of a modified apparatus used in the invention;
FIGURE 3 is a vertical elevation, partially broken away, and in section, of an alternative device according to the invention;
FIGURE 4 is a sectional view of the top portion of a pipe made according to the invention; and
FIGURE 5 is a partial vertical elevation of a corrugated pipe made according to the invention.

Referring more specifically to FIGURE 1 of the drawings there is provided a compounding extruder indicated generally at 2 having a barrel portion 4 and a die section 6 and a circular die opening 8. The annular die opening had a ¾-inch outside diameter.

There was provided a polyethylene composition by making a blend of 100 parts of rigid polyethylene (density 0.96) and 25 parts of Santocel (a finely divided, highly porous silica) containing 20% adsorbed pentane (i.e., the Santocel was 20 parts and the pentane 5 parts to give the total of 25 parts). The composition was extruded through the die opening with a temperature of 340° F. at a pressure of 2000 p.s.i. The emerging cylindrical tube or pipe 10 of foamed polyethylene was cooled externally by directing a blast of air at room temperature, 70° F., from ring nozzle 12 at a velocity of 80 ft./sec. at the outer surface of the pipe. The ring nozzle completely circumscribed the pipe. Internal cooling was provided by introducing air through tube 14 into interior nozzle 16 having openings 17. Air flows in the direction of the arrows and emerged at a velocity of 80 ft./sec. (Instead of air there can be used an air-water vapor mist.)

The emerging hollow cylinder of foamed polyethylene expanded to an external diameter of 1⅜ inches. The rapid chilling formed a tough, impervious, external skin 18 which was 8 mils thick, and a tough, impervious, internal skin 20 which was 10 mils thick. In between the two skins and integrally united to them was a foamed polyethylene core 82 mils thick. The overall average density of the pipe wall was 35 lbs./cu. ft.

As shown in FIGURE 2 there is provided an extruder 30 having an annular die opening 32 of ¾ inch. The same polyethylene and pentane adsorbed Santocel formulation described in connection with FIGURE 1 was extruded at 350° F. and 2000 p.s.i. A blast of air at room temperature, 70° F., at a velocity of 80 ft./sec. was directed through ring nozzle 33 at the outer surface 34 of the cylindrical pipe as it was formed. Internal cooling was provided by passing air at 80 ft./sec. and at a temperature of 70° F. through interior nozzle 36. The interior nozzle is flared outwardly at its open end 38 to distribute the air all around the inner surface of the tube. The emerging cylinder of foam expanded to an outside diameter of 1⅜ inches. It was passed through a moving clamp device 41 composed of a multitude of semi-circular, vertical segments 40. Mating semi-circular, vertical segments are provided on the other side of the pipe so that, in effect, the still slightly soft pipe is closely circumscribed by a circular clamp. In this manner a smooth, outer surface is formed on the pipe. The segments 40 are attached to pulleys 42 on track 44. The segments travel with the extruding pipe for a distance of about 4 feet and then the track turns away from the pipe and then back towards the pipe to eventually return the segments to where they first engage the pipe. Since the segments are very close together and travel at the same speed as the extruding pipe, they act as a continuous, external, moving mold wall in the 4 foot interval. The finished pipe had a wall thickness of 100 mils with an inner skin of 10 mils and an outer skin of 8 mils. The overall density of the pipe was 35 lbs./cu. ft. The finished pipe was rolled up on a large reel (not shown).

If an extremely smooth outer surface is not essential, the moving clamp 41 can be replaced by passing the extruded, expanded pipe through a water cooling trough or a water spray.

FIGURE 3 shows an extrusion apparatus similar to that employed in FIGURE 2 but excluding the clamping device. Instead of extruding polyethylene, the mixture employed in the extrusion was 100 parts of a high impact polystyrene, specifically, polystyrene modified with 5% polybutadiene (Foster Grant's Tuflex 216) and 3 parts of Celite having pentane absorbed thereon. (There were 1.5 parts of pentane and 1.5 parts of Celite to make up the total of 3 parts.) There was also mixed with the high impact polystyrene 0.5 part of Bayol 35, 0.3 part of powdered anhydrous citric acid and 0.4 part of powdered sodium bicarbonate. The mixture was extruded at 300° F. and 2500 p.s.i. Air was blasted at 70° F. and 50 ft./sec. through external nozzle 33 and an air-water vapor mist was blasted through interior nozzle 36 at 80 ft./sec. and 5° F. to produce a pipe having an external, impervious, polystyrene skin 48, an internal, impervious, polystyrene skin 52 and a foamed polystyrene core 50. The pipe formed had an overall thickness of 60 mils, the external skin 48 had a thickness of 8 mils, the internal skin 52 had a thickness of 16 mils, and the foamed core 50 was 36 mils thick.

FIGURE 4 is a sectional view of a portion of a foamed polypropylene pipe made according to the invention. The pipe was of 2 inches external diameter and the pipe wall was composed of a foamed polypropylene core of 100 mils integrally united to an impervious, external skin 62 of 10 mils and an impervious, internal skin 64 of 30 mils. The internal skin was achieved by the addition of a water fog to the internal cooling air directed at the inner surface of the extruding cylindrical pipe. Such a pipe is adapted to carry fluids, e.g., water or air under superatmospheric pressure, e.g., steam at 20 p.s.i.

As previously set forth, the cross section of the tube prepared according to the invention need not be circular. Thus, FIGURE 5 shows a foamed polyethylene, rectangular air conditioning duct 70 having corrugations 72 at periodic intervals which go around all four walls of the duct. The duct in FIGURE 5 has an outer skin and an inner skin of substantially unfoamed, impervious, polyethylene and a similar inner skin and a foamed polyethylene core integrally united to the two skins.

The skins being unfoamed have a density substantially that of the plastic itself in contrast to the much lower density of the foamed core.

What is claimed is:

1. A method of forming a tubular extrusion of a thermoplastic resin form comprising extruding a hot hollow tube of a foamable thermoplastic resin, quench chilling the external wall of said tube by fluid chilling means surrounding said wall within a short time after it emerges from the extrusion die to form an impervious, non-porous, external skin, quench chilling the internal wall of said tube by fluid chilling means surrounded by said wall within a short time after it emerges from the extrusion die to form an impervious, non-porous, internal skin, said chilling of said external and internal walls being insufficient to cool the major portion of the tube whereby the core of the tube expands to form a foam, said core being 50 to 94% of the thickness of said tube.

2. A method according to claim 1 comprising admitting continuously flowing cool air through said means surrounded by the internal wall of the tube in order to chill said wall to form said skin and wherein said foam has a density of 18–40 pounds per cubic foot.

3. A process according to claim 1 wherein the interior and exterior quenching is accomplished by impinging a cool fluid at high velocity on the interior and exterior walls of the tube.

4. A process according to claim 3 comprising applying moving uniform shape controlling means completely around the exterior wall of said tube after formation of said external skin and while said tube is still slightly soft, moving said shape controlling means along with said tube for a distance sufficient to form a smooth, uniform external wall surface and then removing said shape controlling means.

5. A process according to claim 3 wherein the interior and exterior cooling are regulated to produce an interior wall 2 to 5 times as thick as the exterior wall.

References Cited by the Examiner
UNITED STATES PATENTS

| 2,053,112 | 9/1936 | Schnabel | 138—137 |
| 2,256,483 | 9/1941 | Johnston | 260—2.5 |

(Other references on following page)

UNITED STATES PATENTS

| | | | |
|---|---|---|---|
| 2,537,977 | 1/1951 | Dulmage | 264—53 |
| 2,629,899 | 3/1953 | Aller | 264—321 XR |
| 2,708,176 | 5/1955 | Rhodes | 264—209 XR |
| 2,760,228 | 8/1956 | Verges | 264—209 XR |
| 2,767,436 | 10/1956 | Noland et al. | 264—321 |
| 2,814,071 | 11/1957 | Allan et al. | 264—95 XR |
| 2,893,877 | 7/1959 | Nickolls | 99—174 |
| 2,905,972 | 9/1959 | Aykanian et al. | 264—53 |
| 2,922,194 | 1/1960 | Lampard et al. | 264—209 |
| 2,932,323 | 4/1960 | Aries | 138—137 |
| 2,987,767 | 6/1961 | Berry et al. | |
| 3,007,203 | 11/1961 | Ammons | 264—54 |
| 3,001,217 | 12/1961 | Carlson | 264—53 |
| 3,142,092 | 7/1964 | Ralston. | |
| 3,151,358 | 10/1964 | Gerber. | |
| 3,168,207 | 2/1965 | Noland et al. | 264—48 XR |
| 3,189,243 | 6/1965 | Lux | 220—9 XR |
| 3,194,864 | 7/1965 | Richie | 264—51 XR |
| 3,195,184 | 7/1965 | Svec | 264—209 XR |

FOREIGN PATENTS 854,586    11/1960    Great Britain.

OTHER REFERENCES

SPE Journal, "Controlled Density Polystyrene Foam Extrusion," vol. 16, No. 7, July 1960, pp. 705–709.

DONALD J. ARNOLD, *Primary Examiner.*

P. E. ANDERSON, *Assistant Examiner.*

Disclaimer 3,299,192.—*John H. Lux*, Charlestown, Md. METHOD OF EXTRUDING A FOAMED PLASTIC TUBE HAVING INTERNAL AND EXTERNAL SKINS THEREON. Patent dated Jan. 17, 1967. Disclaimer filed Feb. 9, 1970, by the assignee, *Haveg Industries, Inc.*

Hereby enters this disclaimer to claims 1 and 3 of said patent.

[*Official Gazette August 18, 1970.*]